(12) United States Patent
Heuer et al.

(10) Patent No.: US 6,894,142 B2
(45) Date of Patent: May 17, 2005

(54) HIGHLY BRANCHED (CO) POLYCARBONATES HAVING IMPROVED FLOWABILITY

(75) Inventors: Helmut-Werner Heuer, Krefeld (DE); Rolf Wehrmann, Krefeld (DE); Michael Erkelenz, Duisburg (DE)

(73) Assignee: Bayer Materialscience AG, Leverkusen (DE)

( * ) Notice: Subject to any disclaimer, the term of this patent is extended or adjusted under 35 U.S.C. 154(b) by 38 days.

(21) Appl. No.: 10/815,590

(22) Filed: Apr. 1, 2004

(65) Prior Publication Data

US 2004/0220374 A1 Nov. 4, 2004

(30) Foreign Application Priority Data

Apr. 4, 2003 (DE) .......................... 103 15 290

(51) Int. Cl.$^7$ .............................. C08G 64/00
(52) U.S. Cl. .................... 528/196; 264/176.1; 264/219; 528/198
(58) Field of Search .............. 264/176.1, 219; 528/196, 198

(56) References Cited

U.S. PATENT DOCUMENTS

| 4,185,009 | A | 1/1980 | Idel et al. | 260/45.9 R |
|---|---|---|---|---|
| 4,446,298 | A | 5/1984 | Mark et al. | 528/204 |
| 5,367,044 | A | 11/1994 | Rosenquist | 528/204 |
| 6,528,612 | B1 | 3/2003 | Brenner et al. | 528/271 |
| 6,613,869 | B1 | 9/2003 | Horn | 528/198 |
| 2003/0120024 | A1 | 6/2003 | Wehrmann et al. | 528/195 |

FOREIGN PATENT DOCUMENTS

| DE | 42 40 313 | 6/1994 |
|---|---|---|
| EP | 598 320 | 5/1994 |
| EP | 811 619 | 12/1997 |

OTHER PUBLICATIONS

Patent Abstracts of Japan Bd. 1998, Nr. 14, Dec. 31, 1998 & JP 10 251395 A (Mitsubishi Gas Chem Co Inc), Sep. 22, 1998.

Primary Examiner—Terressa Boykin
(74) Attorney, Agent, or Firm—Joseph C. Gil; Aron Preis

(57) ABSTRACT

A process of preparing a branched (co)polycarbonate resin is disclosed. The process entails using at least one compound conforming to formulae 1a or 1b

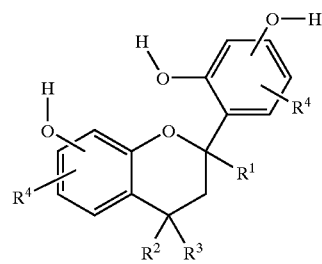

1a

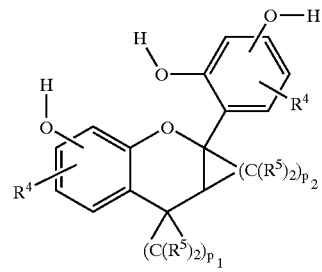

1b in which
$R^1$, $R^2$ and $R^3$ independently denote linear or branched $C_1$–$C_{10}$-alkyl, $R^4$ and $R^5$ independently denote hydrogen or linear or branched $C_1$–$C_{10}$-alkyl, $p_1$ and $p_2$ independently of one another denote a whole number between 3 and 10, as a branching agent.

6 Claims, No Drawings

HIGHLY BRANCHED (CO) POLYCARBONATES HAVING IMPROVED FLOWABILITY

FIELD OF THE INVENTION

The invention is directed to (co)polycarbonate resin and in particular to branched (co)polycarbonates.

SUMMARY OF THE INVENTION

A process of preparing a branched (co)polycarbonate resin is disclosed. The process entails using at least-one compound conforming to formulae 1a or 1b

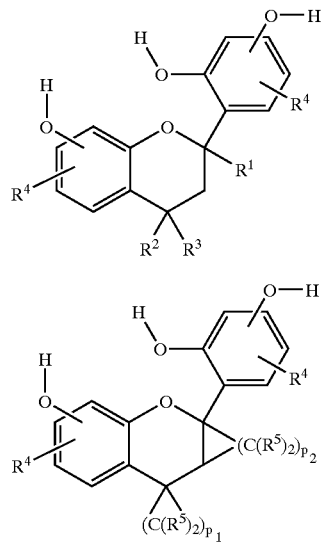

in which
R$^1$, R$^2$ and R$^3$ independently denote linear or branched C$_1$–C$_{10}$-alkyl, R$^4$ and R$^5$ independently denote hydrogen or linear or branched C$_1$–C$_{10}$-alkyl, p$_1$ and p$_2$ independently of one another denote a whole number between 3 and 10, as a branching agent.

BACKGROUND OF THE INVENTION

Aromatic polycarbonates belong to the group of industrial thermoplastics. They are characterized by the combination of the technologically important properties transparency, thermal stability and toughness.

In order to obtain high molecular weight linear polycarbonates by the phase interface process, alkali metal salts of bisphenols are reacted with phosgene in a two-phase mixture. The molecular weight may be controlled by the amount of monophenols, such as for example phenol or tert.-butylphenol. In these reactions practically exclusively linear polymers are formed. This may be confirmed by terminal group analysis.

For the production of linear polycarbonates by the phase interface process reference may be made for example to H. Schnell, Chemistry and Physics of Polycarbonates, Polymer Reviews, Vol. 9, Interscience Publishers, New York 1964 p. 33 ff and to Polymer Reviews, Vol. 10, "Condensation Polymers by Interfacial and Solution Methods", Paul W. Morgan, Interscience Publishers, New York 1965, Chapter VIII, p. 325.

In U.S. Pat. No. 4,185,009, DE A 25 00 092 and JP B 79039040 a process is described in which, starting from mixtures of special bisphenols with chain terminators and isatin bisphenols as branching agents, branched, high molecular weight polycarbonates may be obtained by reaction with phosgene in a phase interface reaction. Copolycarbonates with improved flowability based on bisphenol A and bisphenol TMC with isatin biscresol as branching agent are described in DE A 42 40 313.

In DE A 19913533 highly branched polycarbonates are described, in the production of which there are used oligomeric or polymeric branching agents. Branched polycarbonates are disclosed in DE A 19 943 642, which on account of their intrinsic viscosity are suitable for use as material for water bottles.

Thus, U.S. Pat. No. 5,367,044 describes bottles made of branched polycarbonate in which 1,1,1-tris-(4-hydroxyphenyl)ethane (THPE) is used as branching agent in amounts of 0.28 mole % to 0.36 mole %.

On account of their better flowability compared to linear polycarbonates, branched polycarbonates are particularly useful for applications in which a good flow of the polymer melt at relatively high shear rates is desirable, i.e. for example in the injection molding of complex structures. Branched polycarbonates are characterized by their intrinsic viscosity and are no longer regarded as Newtonian fluids.

The branched polycarbonates previously described in the prior art and their production processes are however unsatisfactory as regards their production or have the disadvantage that the attainable degrees of branching are limited. The use of branching agents leads, above a certain concentration, to gelling, which is manifested in the occurrence of undesirable gel particles. Highly branched polycarbonates cannot be obtained at all with the current branching agents since the reaction batch can no longer be stirred if relatively high concentrations of branching agents are used. A highly viscous agglomerate is formed, which is also referred to as a jelly.

DETAILED DESCRIPTION OF THE INVENTION

The object therefore existed of making available long-chain/branched polycarbonates and processes for their production that avoid these disadvantages. This object is surprisingly achieved by the use of branching agents of the general formulae (1a) and/or (1b)

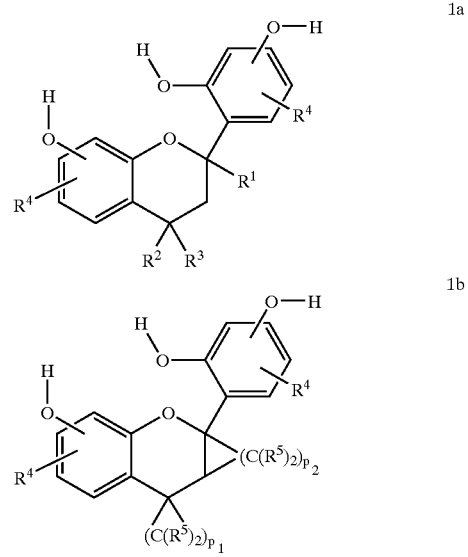

in which
R$^1$, R$^2$ and R$^3$ independently one of the others denote linear or branched C$_1$–C$_{10}$-alkyl, preferably linear or branched $C_1$–$C_8$-alkyl, particularly preferably linear or branched $C_1$–$C_6$-alkyl, $R^4$ denotes hydrogen or linear or branched $C_1$–$C_{10}$-alkyl, preferably linear or branched $C_1$–$C_8$-alkyl, particularly preferably hydrogen or linear or branched $C_1$–$C_6$-alkyl, $R^5$ denotes hydrogen or linear or branched $C_1$–$C_{10}$-alkyl, particularly preferably hydrogen and methyl, $p_1$ and $p_2$ independently of one another denote a whole number between 3 and 10, preferably between 3 and 6, particularly preferably 3 or 4.

In particular structures of the general formula (1a) that are derived from resorcinol are preferably used. A branching agent of the structure (1c) that is derived from resorcinol and acetone is most particularly preferably used.

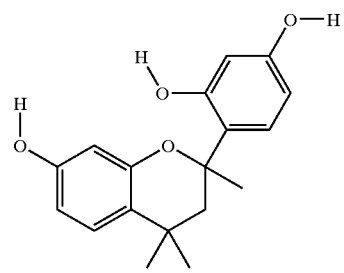

1c

It was also surprisingly found in this connection that the polycarbonates obtained have lower melt viscosities at both low and elevated shear rates than those obtained thus far (with otherwise comparable molecular weight and mechanical properties). This is particularly important for the production of relatively large injection-molded parts such as for example automobile panels. As a result it is easier to fill the molds using conventional injection molding machines.

These branching agents according to the invention may be prepared from resorcinol derivatives or hydroquinone derivatives and ketones, and in the simplest case for example with acetone in an acid-catalysed reaction (see for example P. Livant et al., J. Org. Chem. 1997, 62 737–742).

The synthesis of the branching agents may be carried out for example as a condensation reaction of linear or branched $C_1$–$C_{10}$ alkylketones or $C_5$–$C_{12}$ cycloalkylketones, preferably linear or branched $C_1$–$C_8$ alkylketones or $C_5$–$C_8$ cycloalkylketones, particularly preferably linear or branched $C_1$–$C_6$ alkylketones or $C_5$–$C_6$ cycloalkylketones with $C_1$–$C_{10}$, preferably $C_1$–$C_8$, particularly preferably $C_1$–$C_6$ alkyl-substituted resorcinol derivatives or hydroquinone derivatives in non-polar solvents, preferably toluene, xylenes or halogenated hydrocarbons, particularly preferably toluene or xylenes, most particularly preferably toluene, preferably with the assistance of an acidic catalyst, particularly preferably an acidic ion exchanger, concentrated sulfuric acid or concentrated hydrochloric acid, most particularly preferably an acidic ion exchanger or concentrated sulfuric acid, especially preferably an acidic ion exchanger, at temperatures preferably between 0° and 180° C., particularly preferably between 0° and 160° C., most particularly preferably between 0° and 150° C., with a substoichiometric amount of resorcinol derivative or hydroquinone derivative to ketone derivative of at most 1 to 2, preferably at most 1 to 1.6, particularly preferably at most 1 to 1.5.

The present invention also provides polycarbonates or copolycarbonates that have been produced using the branching agents according to the invention, as well as the corresponding production processes. The branched polycarbonates produced using the branching agents according to the invention and containing the branching agent structures derived from the compounds of the formulae 1a and/or 1b are represented by way of example but not exclusively by the general formulae (2a) and (2b)

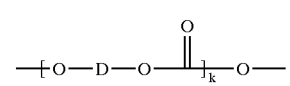

2a

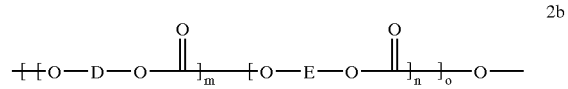

2b wherein the radical O—D—O or O—E—O denotes arbitrary diphenolate radicals in which —D— and —E— independently of one another is an aromatic radical with 6 to 40 C atoms that may contain one or more aromatic or condensed aromatic nuclei, optionally containing heteroatoms, and is optionally substituted with $C_1$–$C_{12}$ alkyl radicals or halogen and may contain aliphatic radicals, cycloaliphatic radicals, aromatic nuclei or heteroatoms as bridge members, and in which k denotes a whole number between 1 and 4000, preferably between 2 and 2000, particularly preferably between 2 and 1000 and most particularly preferably between 2 and 500 and especially preferably between 2 and 300, and m, n and o in each case denote independently of one another numbers between 1 and 4000, preferably between 1 and 2000, particularly preferably between 1 and 1000 and most particularly preferably between 1 and 500, and especially preferably between 1 and 300, —O—D—O— and —OE—O— may independently of one another also denote a radical Va, Vb or Vc, preferably Va and Vc, particularly preferably Vc, derived from the branching agents of the formulae 1a to 1c,

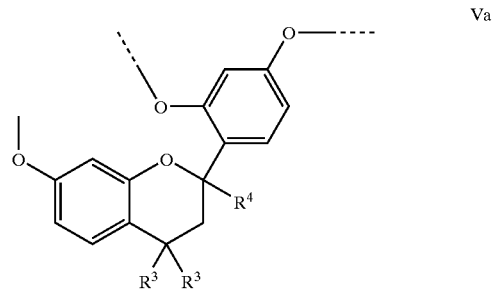

Va

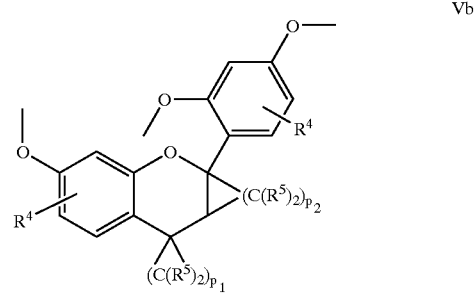

Vb

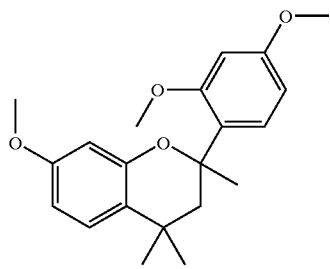

Vc wherein the radicals $R^3$, $R^4$ and $R^5$ as well as $p_1$ and $p_2$ have the meanings mentioned above and whereby a third linkage, a branching of the polymer chain, then occurs at this site.

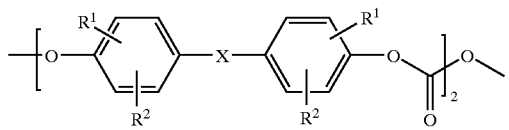

(3)

Preferred diphenolate units of the branched polycarbonates and copolycarbonates according to the invention are derived from general structures of the formula (3), wherein the bracketed structure describes the basic diphenolate radicals, in which $R^1$ and $R^2$ independently of one another denote H, linear or branched $C_1$–$C_{18}$ alkyl or alkoxy radicals, halogen such as Cl or Br, or an optionally substituted aryl or aralkyl radical, preferably H or linear or branched $C_1$–$C_{12}$ alkyl radicals, particularly preferably H or $C_1$–$C_8$ alkyl radicals, and most particularly preferably H or methyl and X denotes a single bond, —$SO_2$—, —CO—, —O—, —S—, a $C_1$ to $C_6$ alkylene radical, $C_2$ to $C_5$ alkylidene radical, $C_5$ to $C_6$ cycloalkylidene radical, which may be substituted by $C_1$ to $C_6$ alkyl, preferably methyl or ethyl radicals, or denotes a $C_6$ to $C_{12}$ arylene radical that may optionally be condensed with further aromatic rings containing heteroatoms, wherein q denotes a whole number between 1 and 4000, preferably between 2 and 2000, particularly preferably between 2 and 1000 and most particularly preferably between 2 and 500 and especially between 2 and 300.

Particularly preferably the diphenolate radicals in the formulae (2) and (3) are derived from the suitable diphenols that are also mentioned hereinafter.

Examples of diphenols that may be mentioned and that also form the basis of the general formula (3) include hydroquinone, resorcinol, dihydroxybiphenyls, bis-(hydroxyphenyl)alkanes, bis-(hydroxyphenyl)cycloalkanes, bis-(hydroxyphenyl)sulfides, bis-(hydroxyphenyl)ethers, bis-(hydroxyphenyl)ketones, bis-(hydroxyphenyl)sulfones, bis-(hydroxyphenyl)sulfoxides, α,α'-bis-(hydroxyphenyl) diisopropylbenzenes as well as their nuclear-alkylated and nuclear-halogenated compounds and also α-ω-(hydroxyphenyl)polysiloxanes.

Preferred diphenols are for example 4,4'-dihydroxybiphenyl (DOD), 2,2-bis-(4-hydroxyphenyl) propane, (bisphenol A), 1,1-bis-(4-hydroxyphenyl)-3,3,5-trimethyl-cyclohexane (bisphenol TMC), 1,1-bis-(4-hydroxyphenyl)-cyclohexane, 2,4-bis-(4-hydroxyphenyl)-2-methylbutane, 1,1-bis-(4-hydroxyphenyl)-1-phenylethane, 1,1-1,4-bis-[2-(4-hydroxyphenyl)-2-propyl]benzene, 1,3-bis-[2-(4-hydroxyphenyl)-2-propyl]benzene (bisphenol M), 2,2-bis-(3-methyl-4-hydroxyphenyl)propane, 2,2-bis-(3-chloro-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl)sulfone, 2,4-bis-(3,5-dimethyl-4-hydroxyphenyl)-2-methylbutane, 2,2-bis-(3,5-dichloro-4-hydroxyphenyl)propane and 2,2-bis-(3,5-dibromo-4-hydroxyphenyl)propane.

Particularly preferred diphenols include for example 2,2-bis-(4-hydroxyphenyl)propane (bisphenol A), 4,4'-dihydroxybiphenyl (DOD), 1,3-bis-[2-(4-hydroxyphenyl)-2-propyl]benzene (bisphenol M), 2,2-bis-(3,5-dimethyl-4-hydroxyphenyl)propane, 1,1-bis-(4-hydroxyphenyl)-1-phenylethane, 2,2-bis-(3,5-dichloro-4-hydroxy-phenyl) propane, 2,2-bis-(3,5-dibromo-4-hydroxyphenyl)propane, 1,1-bis-(4-hydroxyphenyl)cyclohexane and 1,1-bis-(4-hydroxyphenyl)-3,3,5-trimethylcyclohexane (bisphenol TMC).

Most particularly preferred are 2,2-bis-(4-hydroxyphenyl) propane (bisphenol A), 4,4'-dihydroxybiphenyl (DOD), 1,3-bis-[2-(4-hydroxyphenyl)-2-propyl]benzene (bisphenol M) and 1,1-bis-(4-hydroxyphenyl)-3,3,5-trimethylcyclohexane (bisphenol TMC).

The diphenols may be used alone as well as mixtures with one another, and both homopolycarbonates as well as copolycarbonates may be employed. The diphenols are known in the literature or may be obtained by processes known in the literature (see for example H. J. Buysch et al., Ullmann's Encyclopedia of Industrial Chemistry, VCH, New York 1991, $5^{th}$ Edition, Vol. 19, p. 348).

Minor amounts of trifunctional compounds of the formulae (1) (a and/or b) and/or and (Va), (Vb) and/or (Vc) respectively are used as so-called branching agents, preferably amounts between 0.05 and 15 mole %, particularly preferably 0.1 to 10 mole % and most particularly preferably 0.2 to 5 mole % referred to moles of diphenols employed. The resulting long-chain branching leads to certain rheological properties of the polycarbonates obtained, which is expressed in an improved flowability compared to linear types.

The present invention in addition relates to a process for the production of branched polycarbonates and copolycarbonates of the formulae (2a) and (2b), characterized in that bisphenols and branching agents (1a) and/or (1b) are dissolved in aqueous alkaline solution and are reacted with a carbonate source such as phosgene, optionally dissolved in a solvent, in a two-phase mixture consisting of an aqueous alkaline solution, an organic solvent and a catalyst, preferably an amine compound. The reaction may also be carried out in several stages.

The concentration of the bisphenols in the aqueous alkaline solution is 2 to 25 wt. %, preferably 2 to 20 wt. %, particularly preferably 2 to 18 wt. % and most particularly preferably 3 to 15 wt. %. The aqueous alkaline solution consists of water in which hydroxides of alkali metals or alkaline earth metals are dissolved. Sodium and potassium hydroxides are preferred.

When using phosgene as carbonate source the volumetric ratio of aqueous alkaline solution to organic solvent is 5:95 to 95:5, preferably 20:80 to 80:20, particularly preferably 30:70 to 70:30 and most particularly preferably 40:60 to 60:40. The molar ratio of bisphenol to phosgene is less than 1:10, preferably less than 1:6, particularly preferably less than 1:4 and most particularly preferably less than 1:3. The concentration of the branched polycarbonates and copolycarbonates according to the invention in the organic phase is 1.0 to 25 wt. %, preferably 2 to 20 wt. %, particularly preferably 2 to 18 wt. % and most particularly preferably 3 to 15 wt. %.

The concentration of the amine compound referred to the amount of bisphenol used is 0.1 to 10 mole %, preferably 0.2 to 8 mole %, particularly preferably 0.3 to 6 mole % and most particularly preferably 0.4 to 5 mole %.

The carbonate source is phosgene, diphosgene or triphosgene, preferably phosgene. In the case where phosgene is used, a solvent may optionally be omitted and the phosgene may be introduced directly into the reaction mixture.

Tertiary amines such as triethylamine or N-alkylpiperidines may be used as catalyst. Suitable as catalysts are trialkylamines and 4-(dimethylamino)pyridine. Particularly suitable are triethylamine, tripropylamine, triisopropylamine, tributylamine, triisobutylamine, N-methylpiperidine, N-ethylpiperidine and N-propylpiperidine.

Suitable as organic solvent are halogenated hydrocarbons such as methylene chloride and/or chlorobenzene, dichlorobenzene, trichlorobenzene or mixtures thereof, or aromatic hydrocarbons such as for example toluene or xylenes.

The reaction temperature may be from $-5°$ C. to $100°$ C., preferably $0°$ C. to $80°$ C., particularly preferably $10°$ C. to $70°$ C. and most particularly preferably $10°$ C. to $60°$ C.

The molecular weights, Mw, of the branched polycarbonates and copolycar-bonates according to the invention are in the range from 6000 to 200,000 g/mole, preferably between 6000 and 100,000 g/mole, particularly preferably between 10,000 and 80,000 g/mole and most particularly preferably between 12,000 and 70,000 g/mole (determined by means of gel permeation chromatography and polycarbonate calibration).

Preferred, particularly preferred or most particularly preferred are embodiments that make use of the parameters, compounds, definitions and explanations that are mentioned hereinbelow as preferred, particularly preferred, most particularly preferred or especially preferred, etc.

The definitions, parameters, compounds and explanations given in general or in preferred ranges in the description may however also be combined as desired with one another, i.e. between the respective ranges and preferred ranges.

The branched polycarbonates and copolycarbonates according to the invention may be worked up in a known manner and processed into arbitrary molded articles, for example by extrusion, injection molding or extrusion blow molding.

The branched polycarbonates and copolycarbonates according to the invention may also be mixed in a known way, for example by compounding, with other aromatic polycarbonates and/or other aromatic polyester carbonates and/or other aromatic polyesters.

The branched polycarbonates and copolycarbonates according to the invention may also contain in functional amounts the additives conventionally used for these thermoplastic materials, such as fillers, UV stabilisers, thermal stabilisers, antistatics and pigments; if necessary the mold release behaviour, the flowability and/or the flame resistance may also be improved by adding external mold release agents, flow improvers and/or flameproofing agents (e.g. alkyl and aryl phosphites, phosphates, phosphanes, low molecular weight carboxylic acid esters, halogenated compounds, salts, chalk, quartz flour, glass and carbon fibres, pigments and combinations thereof. Such compounds are described for example in WO 99/55772, pp. 15–25, and in the corresponding chapters of "Plastics Additives Handbook", Ed. Hans Zweifel, $5^{th}$ Edition 2000, Hanser Publishers, Munich).

The branched polycarbonates and copolycarbonates according to the invention, optionally mixed with other thermoplastic materials and/or conventional additives, may be processed into shaped molded articles/extrudates and used everywhere where already known polycarbonates, polyester carbonates and polyesters are employed. On account of their property profile they are suitable in particular as materials for the injection molding of larger molded parts, for example automobile panels and sheets. They are however also suitable as substrate materials for optical data storage media such as for example CDs, CD-Rs, DVDs or DVD-Rs, but may however also be used for example as films in the electrical sector, as molded parts in automobile construction and as panels for coverings in the safety sector. Further possible uses of the polycarbonates according to the invention include the following:

1. Safety panels, which as is known are necessary in many areas of buildings, vehicles and aircraft, as well as helmet shields.
2. Production of films, in particular ski films.
3. Production of blow-molded articles (see for example U.S. Pat. No. 2,964,794), for example 1-gallon to 5-gallon water tanks.
4. Production of light-permeable panels, in particular hollow panels, for example for covering buildings such as railway stations, greenhouses and lighting installations.
5. Production of optical data storage media.
6. Production of traffic light housings or traffic signs.
7. Production of foams (see for example DE-B 1 031 507).
8. Production of threads and wires (see for example DE-B 1 137 167 and DE-A 1 785 137).
9. As translucent plastics with a content of glass fibres for light technology applications (see for example DE-A, 1 554 020).
10. As translucent plastics with a content of barium sulfate, titanium dioxide and/or zirconium oxide or organic polymeric acrylate rubbers (EP-A 634 445, EP-A 269324) for the production of light-permeable and light-scattering molded parts.
11. Production of precision injection-molded parts, such as for example lens holders. For this purpose polycarbonates are used with a content of glass fibres that may optionally contain in addition about 1 to 10 wt. % of $MoS_2$ referred to the total weight.
12. Production of optical instrument parts, in particular lenses for cameras and camcorders (DE-A 2 701 173).
13. As light transmission carriers, in particular light-conducting cables (see for example EP-A 0 089 801).
14. As electrically insulating materials for electrical conductors and for plug housings and sockets.
15. Production of mobile telephone housings having improved resistance to perfume, aftershave and sweat.
16. Network interface devices.
17. As carrier material for organic photoconductors.
18. Production of lamps, e.g. headlamps, light-diffusing panels or internal lenses, as well as long-range lamps.
19. For medical applications such as oxygenators and dialysis machines.
20. For foodstuffs applications such as for example bottles, crockery and chocolate molds.
21. For applications in the automobile sector, where contact with fuels and lubricants may occur, such as for example bumpers, optionally in the form of suitable blends with ABS or suitable rubbers.

22. For sports articles such as for example slalom poles or ski boot fastenings.
23. For household articles such as for example kitchen sink units and.letterbox housings.
24. For housings such as for example electrical distribution cabinets.
25. Housings for electrical toothbrushes and hairdryers.
26. Transparent washing machine portholes with improved resistance to detergents.
27. Protective goggles, optical correction glasses.
28. Lamp coverings for kitchen appliances with improved resistance to kitchen vapours, in particular oil vapours.
29. Packaging foils for medicaments.
30. Chip containers and chip carriers.
31. For miscellaneous applications, such as for example stable doors or animal cages.

The molded articles and extrudates made from the polymers according to the invention are also covered by the present application.

The following examples are intended to illustrate the invention without however restricting the latter.

C. sump temperature (130° C. bath temperature). After ca. 1 hour a slightly beige-cloudy suspension was formed. The suspension was stirred for a further 3 hours. After cooling, the product was isolated from the reaction solution by filtration and dried overnight in a water jet vacuum.

Yield: 140 g (41% of theory) of a white powder.

Analysis $^1$H-NMR (400 MHz, TMS, DMSO) δ=9.28 (s, 1H), 9.04 (s, 1H), 8.94 (s, 1H), 6.90–6.94 (d, 1H), 6.80–6.84 (d, 1H), 6.25–6.26 (d, 3H), 6.01–6.04 (d, 1H), 2.89–2.93 (d, 1H), 1.73–1.77 (d, 1H), 1.57 (s, 3H), 1.14 (s, 3H), 0.66 (s, 3H).

A 2D-HMBC experiment confirms the structure given under Example 1. Only one isomer with an aromatic ring on a quaternary C atom adjacent to an oxygen atom is detected.

GC-MS after derivatisation as trimethylsilyl derivative: in this connection the expected TMS molecular weight of 516 is found as a single product peak.

Examples 2–8

The syntheses of the branching agent under altered conditions as regards the stoichiometric ratio of resorcinol to acetone are carried out similarly to Example 1. The yields are given in the following table:

| No. | Amount weighed out g Resorcinol | Amount weighed out mole Resorcinol | Amount weighed out g Acetone | Amount weighed out mole Acetone | Ratio moles Resorcinol/ Acetone | Ion Exch. g | Toluene ml | Yield g | Yield % |
|---|---|---|---|---|---|---|---|---|---|
| 2 | 500 | 4.54 | 395.6 | 6.81 | 1 to 1.5 | 833.3 | 4000 | 200.99 | (681.82 g) 29.5% |
| 3 | 250 | 2.27 | 197.8 | 3.41 | 1 to 1.5 | 416 | 1800 | 63.16 | (340 g) 18.6% |
| 4 | 250 | 2.27 | 197.8 | 3.41 | 1 to 1.5 | 416 | 1800 | 140 | (340 g) 41% |
| 5 | 1750 | 15.89 | 593.4 | 10.22 | 1 to 0.6 | 1248 | 5400 | 240 | (2386.4 g) 10.1% |
| 6 | 1000 | 9.08 | 791.2 | 13.62 | 1 to 1.5 | 1664 | 8000 | 390 | (1363 g) 28.6% |
| 7 | 1000 | 9.08 | 791.2 | 13.62 | 1 to 1.5 | 1664 | 8000 | 370 | (1363 g) 27.1% |
| 8 | 1000 | 9.08 | 791.2 | 13.62 | 1 to 1.5 | 1664 | 8000 | 420 | (1363 g) 30.8% |

EXAMPLES

Example 1

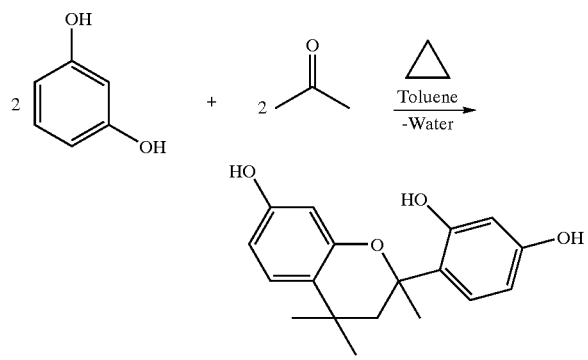

250 g (2.27 mole) of resorcinol, 197.8 g (3.41 mole) of acetone and 1800 ml of toluene were added to a vessel under nitrogen and homogeneously dissolved at 50° C. 416 g of acidic ion exchanger (Lewatit K1221, Bayer Leverkusen) were added and the reaction mixture was then heated to 82°

Example 9

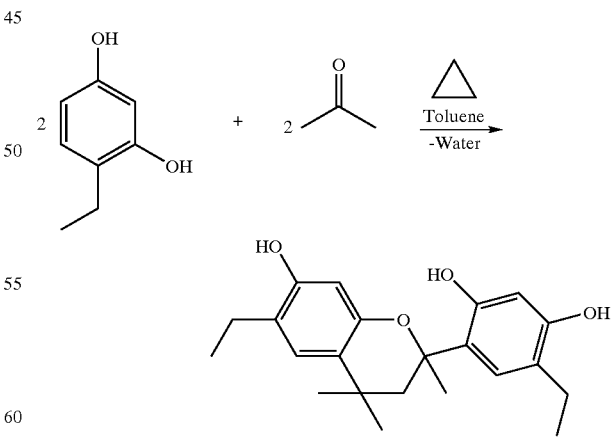

37.31 g (0.27 mole) of 4-ethylresorcinol (Aldrich company), 23.52 g (0.405 mole) of acetone and 300 ml of toluene were added to a vessel under nitrogen and homogeneously dissolved at 50° C. 50 g of acidic ion exchanger (Lewatit K1221, Bayer Leverkusen) were added and the reaction mixture was then heated under reflux. After ca. 1 day a yellow, clear solution formed, and after 2 days a cloudy orange solution with some precipitate formed. After cooling, this precipitate was removed by filtration. The filtrate was concentrated by evaporation, 29.0 g of a brown crude product being obtained that was recrystallised in a mixture of methylene chloride and petroleum ether (1:1). In this way 13 g of a pale beige to yellow solid were obtained, which was recrystallised in a mixture of methylene chloride and petroleum ether (1:1). After drying in a water jet vacuum overnight at 60° C., the desired product was obtained.

Yield: 7.0 g (14.5% of theory) of a white powder.
Analysis:
$^1$H-NMR (400 MHz, TMS, DMSO) δ=9.02 (s, 1H), 8.92 (s, 1H), 8.75 (s, 1H), 6.90–6.94 (d, 1H), 6.80 (s, 2H), 6.33–6.27 (d, 2H), 2.86–2.82 (d, 1H), 2.15–2.45 (m, 4H), 1.79–1.75 (d, 1H), 1.54 (s, 3H), 1.15 (s, 3H), 1.04 (t, 3H), 0.89 (t, 3H), 0.67 (s, 3H).

A byproduct identified by $^1$H-NMR (400 MHz, TMS, DMSO) (precipitate separated at the beginning) has the following structure:
$^1$H-NMR (400 MHz, TMS, DMSO) δ=8.84 (s, 2H), 6.98 (s, 2H), 5.97 (s, 2H), 2.42–2.50 (m, 4H), 2.0–1.85 (m, 4H), 1.46 (s, 6H), 1.25 (s, 6H), 1.07–1.1 (t,6H).

Example 10

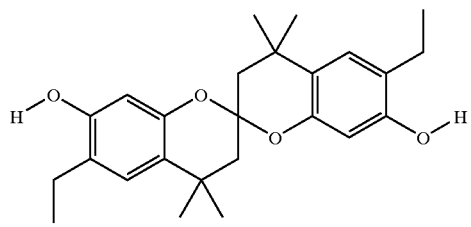

28.41 of methylene chloride and 91 of chlorobenzene are added to a solution of 4096.3 g (17.94 mole) of bisphenol A and 1584 g (39.6 mole) of sodium hydroxide in 28.41 of water made inert with nitrogen. 17.30 g (0.0576 mole or 0.32 mole % with respect to bisphenol A) of the branching agent of Example 1 and 91.92 g (0.612 mole or 3.4 mole % with respect to bisphenol A) of p-tert.-butylphenol (BUP) as chain terminator were added in a one-stage procedure. 3560 g (36 mole) of phosgene are added over 1 hour 20 minutes at a pH of 13.4 and a temperature of 21° C. In order that the pH value did not fall below 12.6, 25% sodium hydroxide solution was added during the phosgenation. After completion of the phosgenation and flushing with nitrogen, 24.7 ml (0.18 mole, 1 mole % with respect to bisphenol A) of n-ethylpiperidine are added as catalyst and the reaction mixture is stirred for 1 hour. The organic phase is acidified with phosphoric acid after separating the aqueous phase and is washed neutral and free of salts with distilled water. After replacing the solvent by chlorobenzene the product is extruded through an evaporation extruder. 3951.5 g of polycarbonate are obtained.
Analysis:
$^1$H-NMR content of branching agent: 0.28 mole %; content of chain terminator: 3.28 mole %.
Relative solution viscosity in methylene chloride (0.5 g/100 ml solution):
1.30.
Gel permeation chromatography (calibration with BPA polycarbonate):
molecular weight Mw=31786, non-uniformity D=2.55).

Example 11

Determination of the viscosity as a function of the shear rate (ISO 11443).

The branched polycarbonate obtained in Example 10 is investigated rheologically at 300° C. The following data are obtained:

| Shear Gradient [s$^{-1}$] | Viscosity [Pas] |
|---|---|
| 50 | 851 |
| 100 | 727 |
| 200 | 612 |
| 500 | 459 |
| 1000 | 343 |
| 1500 | 276 |
| 5000 | 134 |

Example 12 (Comparison Example)

For comparison purposes a linear BPA polycarbonate (Makrolon 3108, Bayer AG) with a molecular weight Mw=31000 is used similarly to Example 11.

| Shear Gradient [s$^{-1}$] | Viscosity [Pas] |
|---|---|
| 50 | 789 |
| 100 | 764 |
| 200 | 704 |
| 500 | 571 |
| 1000 | 448 |
| 1500 | 351 |
| 5000 | 172 |

As can be seen from a comparison of the viscosity data of Examples 11 and 12, with the same molecular weight the melt viscosity at 300° C. is less over almost the whole range of the shear gradient (except at very low shear rates). At higher shear rates (injection molding applications) the branched polycarbonate of Example 2 flows more easily than the comparison material.

Examples 13–31

The following branched polycarbonates, which are characterized by a higher content of incorporated branching agents from Example 1, are prepared similarly to Example 2.

| Ex. | Mole % BUP | Mole % Brch. Agt. from Example 1 | Ratio % BUP / % Brch. Agt. | Rel. Soln. Visc. | Tg (° C.) | Mw | Mn |
|---|---|---|---|---|---|---|---|
| 13 | 3 | 0.5 | 6 | 1.304 | 147.7 | 36400 | 12230 |
| 14 | 5 | 0.7 | 7.1 | 1.267 | 144 | 29800 | 9870 |
| 15 | 7 | 1 | 7 | 1.215 | 140 | 23450 | 7223 |
| 16 | 10 | 1.5 | 6.7 | 1.172 | 132 | 20150 | 5380 |
| 17 | 12 | 3 | 4 | 1.162 | 129 | 22600 | 4740 |
| 18 | 3 | 0.7 | 4.3 | 1.44 | 151 | 66460 | 14000 |
| 19 | 5 | 1.25 | 4 | 1.361 | 148 | 57000 | 11800 |
| 20 | 8 | 1.5 | 5.3 | 1.219 | 141 | 27700 | 7400 |
| 21 | 10 | 3 | 3.3 | 1.288 | 139 | 59200 | 7800 |
| 22 | 5 | 0.7 | 7.1 | 1.283 | 148.6 | 31600 | 11500 |
| 23 | 3 | 0.8 | 3.76 | 1.548 | 154 | | |
| 24 | 3 | 1 | 3 | 1.638 | 154 | | |
| 25 | 3 | 1.2 | 2.5 | 1.794 | 151 | | |
| 26 | 8 | 1.5 | 5.33 | 1.21 | 144.8 | 24400 | 6830 |
| 27 | 5 | 0.6 | 8.33 | 1.257 | 147.4 | 27300 | 9100 |

-continued

| Ex. | Mole % BUP | Mole % Brch. Agt. from Example 1 | Ratio % BUP % Brch. Agt. | Rel. Soln. Visc. | Tg (° C.) | Mw | Mn |
|---|---|---|---|---|---|---|---|
| 28 | 6 | 0.8 | 7.5 | 1.255 | 147.9 | 28800 | 9200 |
| 29 | 4 | 0.5 | 8 | 1.322 | 151.1 | 36860 | 11500 |
| 30 | 4 | 0.3 | 13.33 | 1.307 | 150.3 | 33100 | 11300 |
| 31 | 3 | 0.5 | 10 | 1.385 | 152.3 | 43700 | 15500 |

BUP = p-t-butylphenol

Surprisingly, in none of the examples according to the invention were there any problems in the synthesis that were manifested in the formation of a jelly.

Example 32

Determination of the viscosity as a function of the shear rate (ISO 11443).

The branched polycarbonate obtained in Example 26 is investigated rheologically at 300° C. The following data are obtained:

| Shear Gradient [s⁻¹] | Viscosity [Pas] |
|---|---|
| 50 | 138 |
| 100 | 138 |
| 200 | 129 |
| 500 | 110 |
| 1000 | 91 |
| 1500 | 80 |
| 5000 | 49 |

Example 33

Determination of the viscosity as a function of the shear rate (ISO 11443).

The branched polycarbonate obtained in Example 27 is investigated rheologically at 300° C. The following data are obtained:

| Shear Gradient [s⁻¹] | Viscosity [Pas] |
|---|---|
| 50 | 207 |
| 100 | 203 |
| 200 | 191 |
| 500 | 163 |
| 1000 | 137 |
| 1500 | 121 |
| 5000 | 73 |

Example 34

Determination of the viscosity as a function of the shear rate (ISO 11443).

The branched polycarbonate obtained in Example 28 is investigated rheologically at 300° C. The following data are obtained:

| Shear Gradient [s⁻¹] | Viscosity [Pas] |
|---|---|
| 50 | 420 |
| 100 | 385 |

-continued

| Shear Gradient [s⁻¹] | Viscosity [Pas] |
|---|---|
| 200 | 328 |
| 500 | 249 |
| 1000 | 193 |
| 1500 | 165 |
| 5000 | 89 |

Example 35

A polycarbonate of 70 mole % of BPA, 30 mole % of 4,4'-dihydroxybiphenyl (DOD), 0.3 mole % of the branching agent of Example 1 as well as 4.9 mole % of p-tert.-butylphenol as chain terminator was produced in a similar way as described in Example 10.

Analysis

Mw: 28700 g/mole; Mn: 11200 g/mole;

Vicat VSTB 120: 140° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the process of preparing a branched (co) polycarbonate resin the improvement comprising reacting at least one member selected from the group consisting of compounds of the formulae 1a and/or 1b

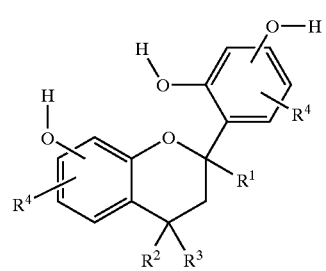

1a

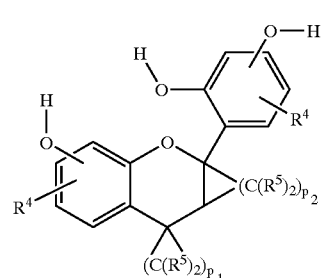

1b in which

R$^1$, R$^2$ and R$^3$ independently denote linear or branched C$_1$–C$_{10}$-alkyl, R$^4$ and R$^5$ independently denote hydrogen or linear or branched C$_1$–C$_{10}$-alkyl, p$_1$ and p$_2$ independently of one another denote a whole number between 3 and 10.

2. In the phase interface process for the production of (co)polycarbonate resin the improvement comprising reacting at least one member selected from the group consisting of compounds of the formulae 1a and 1b

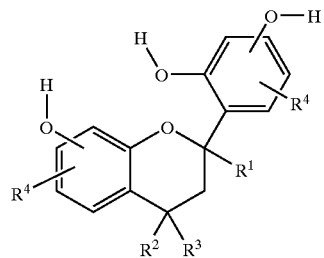

1a

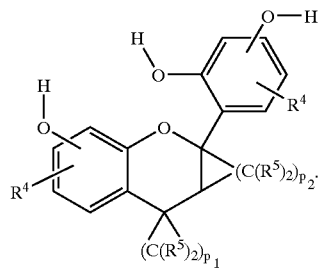

1b

3. The (co)polycarbonate prepared by the process of claim 1.

4. The (co)polycarbonate prepared by the process of claim 3.

5. A molded article comprising the polycarbonate of claim 4.

6. A molded article comprising the polycarbonate of claim 5.

* * * * *